(12) United States Patent
Presley et al.

(10) Patent No.: US 10,902,659 B2
(45) Date of Patent: Jan. 26, 2021

(54) INTELLIGENT PHOTOGRAPH OVERLAY IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Taylor Presley, Raleigh, NC (US); Kaleigh E. Williams, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/136,078

(22) Filed: Sep. 19, 2018

(65) Prior Publication Data

US 2020/0090391 A1    Mar. 19, 2020

(51) Int. Cl.
| | |
|---|---|
| *G06T 13/40* | (2011.01) |
| *G06T 11/60* | (2006.01) |
| *G06T 13/80* | (2011.01) |
| *G06Q 20/12* | (2012.01) |

(52) U.S. Cl.
CPC .......... *G06T 13/40* (2013.01); *G06Q 20/123* (2013.01); *G06T 11/60* (2013.01); *G06T 13/80* (2013.01)

(58) Field of Classification Search
None
See application file for complete search history.

(56) References Cited

U.S. PATENT DOCUMENTS

| | | | |
|---|---|---|---|
| 8,243,074 B1* | 8/2012 | Kilat | G06Q 40/12 |
| | | | 345/440 |
| 8,788,951 B2 | 7/2014 | Zalewski et al. | |
| 9,285,951 B2 | 3/2016 | Makofsky et al. | |
| 10,454,857 B1* | 10/2019 | Blackstock | H04L 51/32 |
| 10,664,903 B1* | 5/2020 | Haitani | G06F 3/1407 |
| 2005/0231473 A1* | 10/2005 | Kim | A63F 13/12 |
| | | | 345/157 |
| 2009/0300525 A1 | 12/2009 | Jolliff et al. | |
| 2011/0047046 A1* | 2/2011 | Torres | G06Q 30/0613 |
| | | | 705/26.41 |
| 2011/0184839 A1 | 7/2011 | Chen et al. | |
| 2012/0198359 A1* | 8/2012 | Lossia | G06Q 50/01 |
| | | | 715/758 |
| 2013/0194280 A1* | 8/2013 | Kwon | G06T 13/40 |
| | | | 345/473 |
| 2014/0010449 A1* | 1/2014 | Haaramo | G06Q 30/06 |
| | | | 382/173 |
| 2014/0035913 A1* | 2/2014 | Higgins | G06Q 30/00 |
| | | | 345/420 |
| 2014/0078144 A1* | 3/2014 | Berriman | A63F 13/10 |
| | | | 345/426 |
| 2014/0324600 A1 | 10/2014 | Soffin | |

(Continued)

*Primary Examiner* — Andrew G Yang
(74) *Attorney, Agent, or Firm* — Griffiths & Seaton PLLC

(57) ABSTRACT

Embodiments for intelligent photograph overlay in an Internet of Things (IoT) computing environment by a processor. One or more avatar characteristic features associated with one or more selected items may be activated upon detecting a transaction agreement from one of a plurality of transaction agreement types. The one or more avatar characteristic features may be changed on an avatar according to a user preference.

20 Claims, 6 Drawing Sheets

(56) References Cited

U.S. PATENT DOCUMENTS

| | | | |
|---|---|---|---|
| 2015/0154691 A1* | 6/2015 | Curry | G06F 30/23 |
| | | | 705/27.2 |
| 2015/0193861 A1* | 7/2015 | Reed | G06Q 10/083 |
| | | | 705/14.4 |
| 2015/0312290 A1 | 10/2015 | Dawson et al. | |
| 2017/0024807 A1* | 1/2017 | Jhamtani | G06N 20/00 |
| 2017/0323266 A1* | 11/2017 | Seo | G06Q 50/30 |
| 2018/0054405 A1 | 2/2018 | Ritch et al. | |
| 2018/0315254 A1* | 11/2018 | Grant | G06T 19/20 |
| 2019/0355008 A1* | 11/2019 | Sewak | G06Q 30/0275 |

* cited by examiner

INTELLIGENT PHOTOGRAPH OVERLAY IN AN INTERNET OF THINGS (IOT) COMPUTING ENVIRONMENT

BACKGROUND OF THE INVENTION

Field of the Invention

The present invention relates in general to computing systems, and more particularly, to various embodiments for intelligent photograph overlay in an Internet of Things (IoT) computing environment using a computing processor.

Description of the Related Art

Computing systems may be found in the workplace, at home, or at school. In today's society, consumers, businesspersons, educators, and others communicate over a wide variety of mediums in real time, across great distances, and many times without boundaries or borders. The advent of computers and networking technologies has made possible the intercommunication of people from one side of the world to the other. These computing systems allow for the sharing of information between users in an increasingly user friendly and simple manner. The increasing complexity of society, coupled with the evolution of technology, continue to engender the sharing of a vast amount of information between people.

SUMMARY OF THE INVENTION

Various embodiments of a cognitive system for intelligent photograph overlay in an Internet of Things (IoT) computing environment by a processor are provided. In one embodiment, by way of example only, a method for intelligent photograph overlay of an avatar in an application in an Internet of Things (IoT) computing environment, again by a processor, is provided. One or more avatar characteristic features associated with one or more selected items may be activated upon detecting a transaction agreement from one of a plurality of transaction agreement types. The one or more avatar characteristic features may be changed on an avatar according to a user preference.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
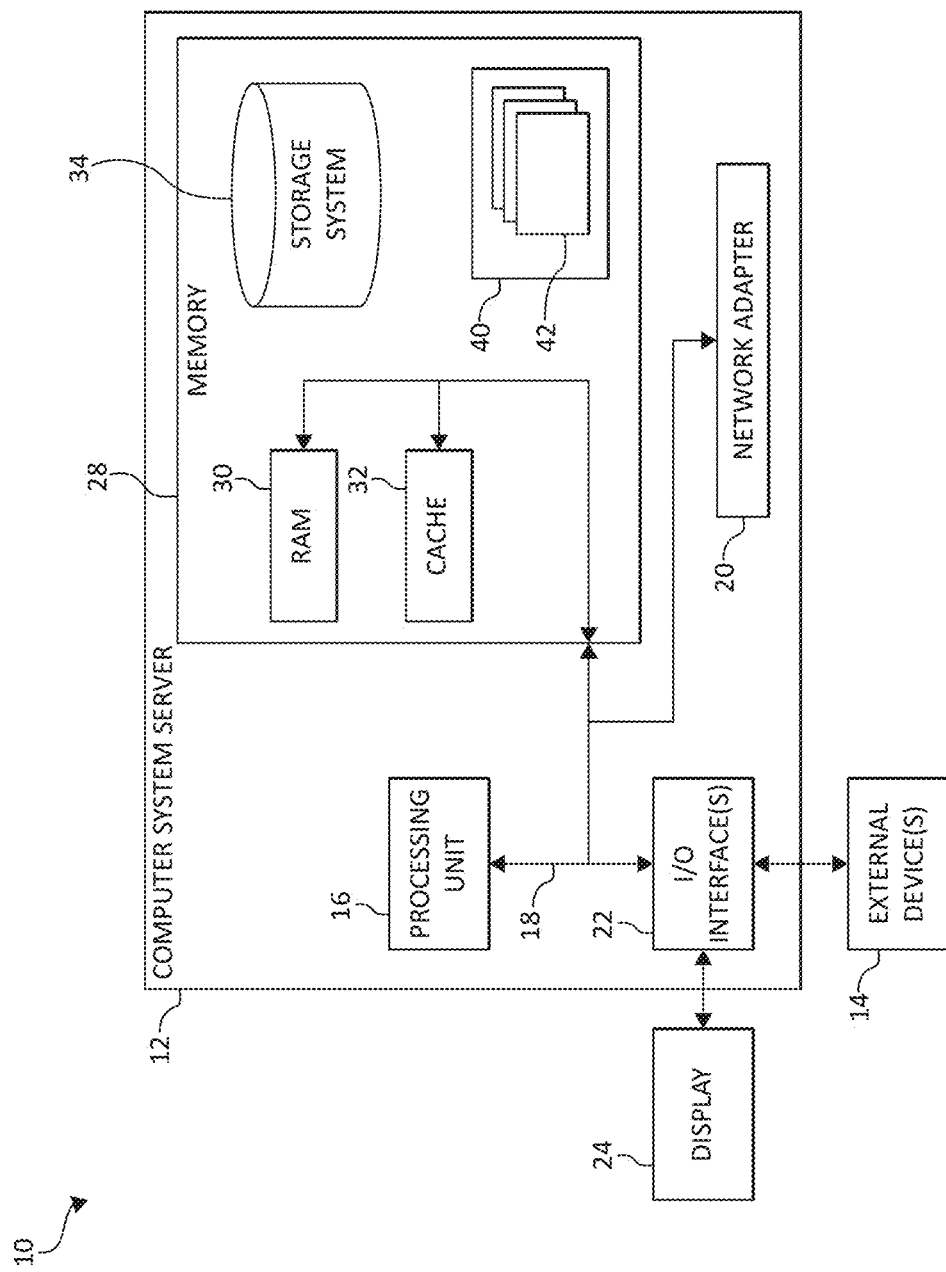
FIG. 1 is a block diagram depicting an exemplary cloud computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein.

Moreover, a virtual universe (VU) is a computer-based simulated world or environment; other terms for VU's include metaverses, "3-D Internet" and Virtual World, and VU will be understood to represent any of these environments. Users may inhabit and traverse a VU and may interact with other VU users through the use of an avatar, a graphical representation of the user often taking the form of a cartoon-like human though any graphic image may be utilized. In order to participate within or inhabit a VU a user may create an agent which functions as the user's account, and upon which the user builds an avatar tied to an inventory of assets the user owns in the VU and associated with the agent.

In one aspect, VU users may identify and recognize other user avatars in business and social interactions by recognition of avatar visual aspects such as character facial features, height, clothing, skin color and tone, body girth, etc., in some respects as people in real life recognize other people. More particularly, real world people and VU avatars may be readily distinguished by distinctive features or feature combinations unique to the person or avatar, and thus notorious or previously met avatars may be easily identified in subsequent social interactions. For example, in a social media network, one or more connections may be established between a person's virtual avatar and environment, and the person's real life persona and environment (e.g., a user updating their avatar, stickers, and filters).

Accordingly, various embodiments are provided herein to provide systematic updates to the avatar, stickers, and filters according to one or more contextual factors, parameters, and/or user preferences such as, for example, current weather conditions, a geographical location, physical features and styling, likes and dislikes, user's purchase and/or interest. For example, one or more filters may be applied to an avatar to select and apply a modification or a "sticker" onto the avatar such as, for example, selected from a pool or bank or gallery of such "stickers" or modifications or add-ons from the selected items that have been purchased or intended to be purchase). A repository of avatars and/or on-screen "stickers" and corresponding animation frames for each of the various avatar characteristic features may be used.

More specifically, aspects of the present invention provide for intelligent photo overlays for dynamic and systematic changing or updating avatars, stickers, and/or filters. One or more avatar characteristic features associated with one or more selected items may be activated upon detecting a transaction agreement from one of a plurality of transaction agreement types. The one or more avatar characteristic features may be changed on an avatar according to a user preference.

Accordingly, the present invention provides for intelligent notification during an event in an Internet of Things (IoT) computing environment. One or more user equipment (UE) may be enabled with an avatar capable application that has been loaded with a preset of stickers, filters, phrases and elements relative to an identified location's products (e.g., jewelry, clothing, shoes, or other commodities from a retail store and/or online retail store or other business). The UE is activated to purchase one or more selected via an application such as, for example, an application (e.g., a commerce application) or online store from one or more businesses. A user may select items for purchase within a commerce application. Depending on a purchase identified in a shopping cart of the commerce application, the avatar, filter, and/or stickers may incorporate the selected items (that have been purchased and/or identified for purchase) in an avatar enable application (e.g., a social media network). For example, the avatar characteristic features (e.g., the selected items that have been purchased and/or identified for purchase) may include, but not limited, to filters, stickers, semantic phrases, jewelry, articles of clothing, and purchased products from one or more third parties. More specifically, the avatar characteristic features may include: 1) clothing (e.g., shoes, clothes, shopping bags, goods, articles, and/or items) from a business, 2) accessories (e.g., jewelry), 3) food (e.g., branded to go bag, specific food items from a restaurant, groceries, etc.) 3) actions (e.g., pumping gas, grocery shopping, gym membership, dry cleaning, tickets to an event such as, for example, a concert, play, movie, sporting event, etc.), 4) information (e.g., dates, calendar data, sales, cancellations, mottos, logo, coupon codes, etc.), 5) an avatar, filter, or stickers that may be shared with one or more alternative users (e.g., associates, family, friends, social media contacts) that may display the avatar characteristic features (e.g., the selected items that have been purchased and/or identified for purchase).

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning, which may include using sensor based devices or other computing systems that include audio or video devices. Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
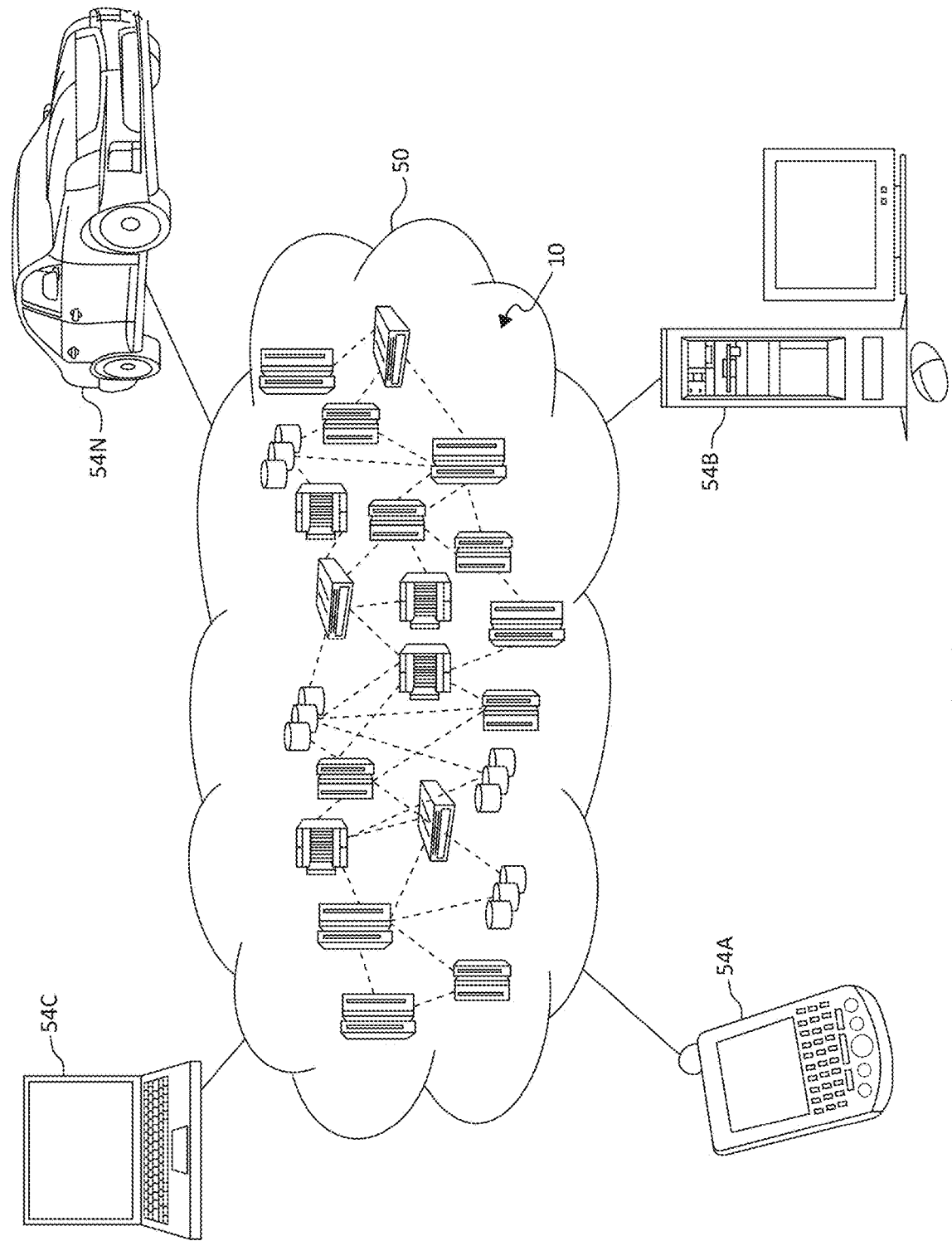
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
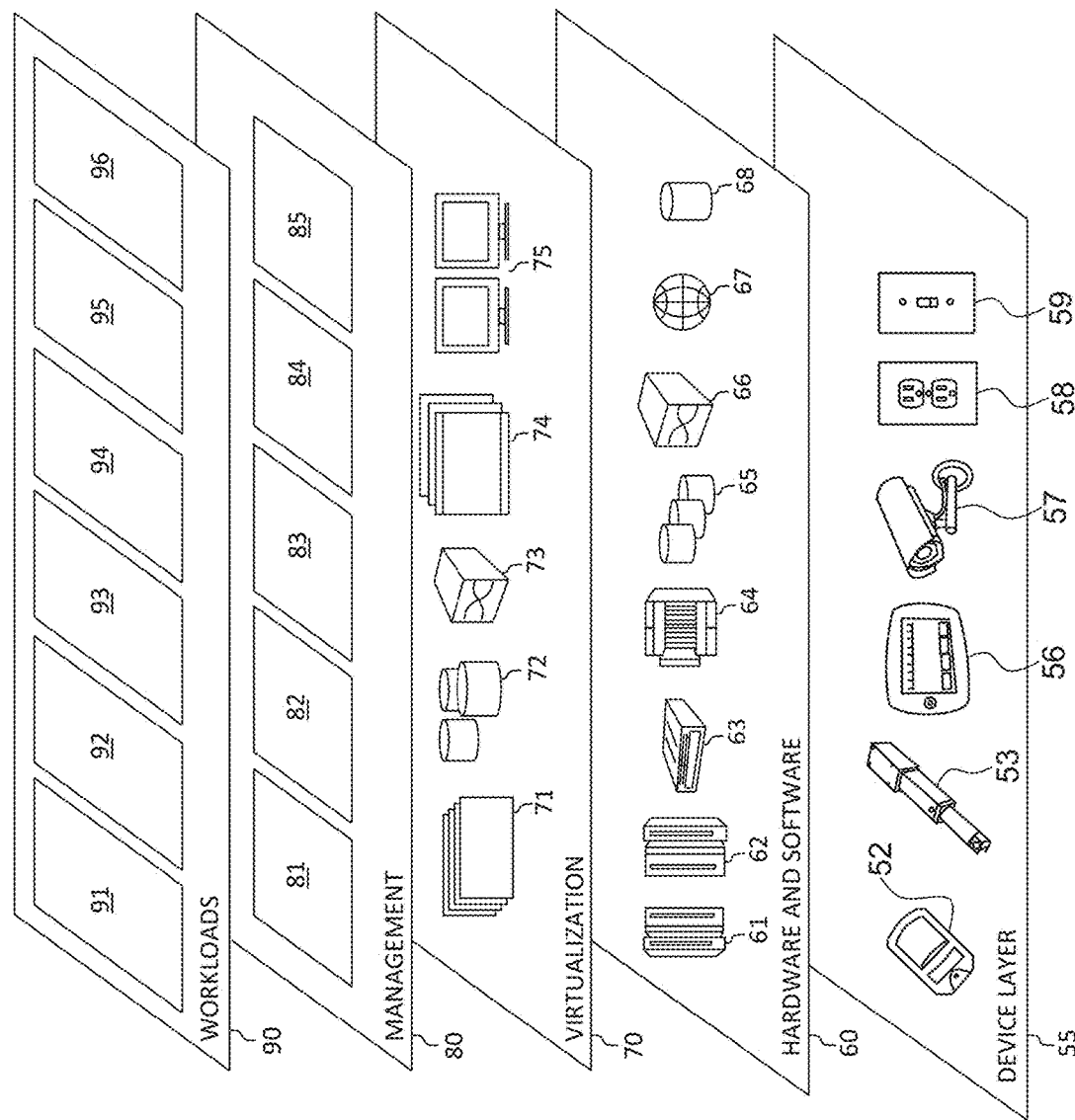
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent photograph overlay. In addition, workloads and functions 96 for intelligent photograph overlay may include such operations as data analysis, data authentication and identification, device identity/attribute analysis, user identity/attribute analysis, and as will be further described, user and device management functions. One of ordinary skill in the art will appreciate that the workloads and functions 96 for intelligent photograph overlay may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
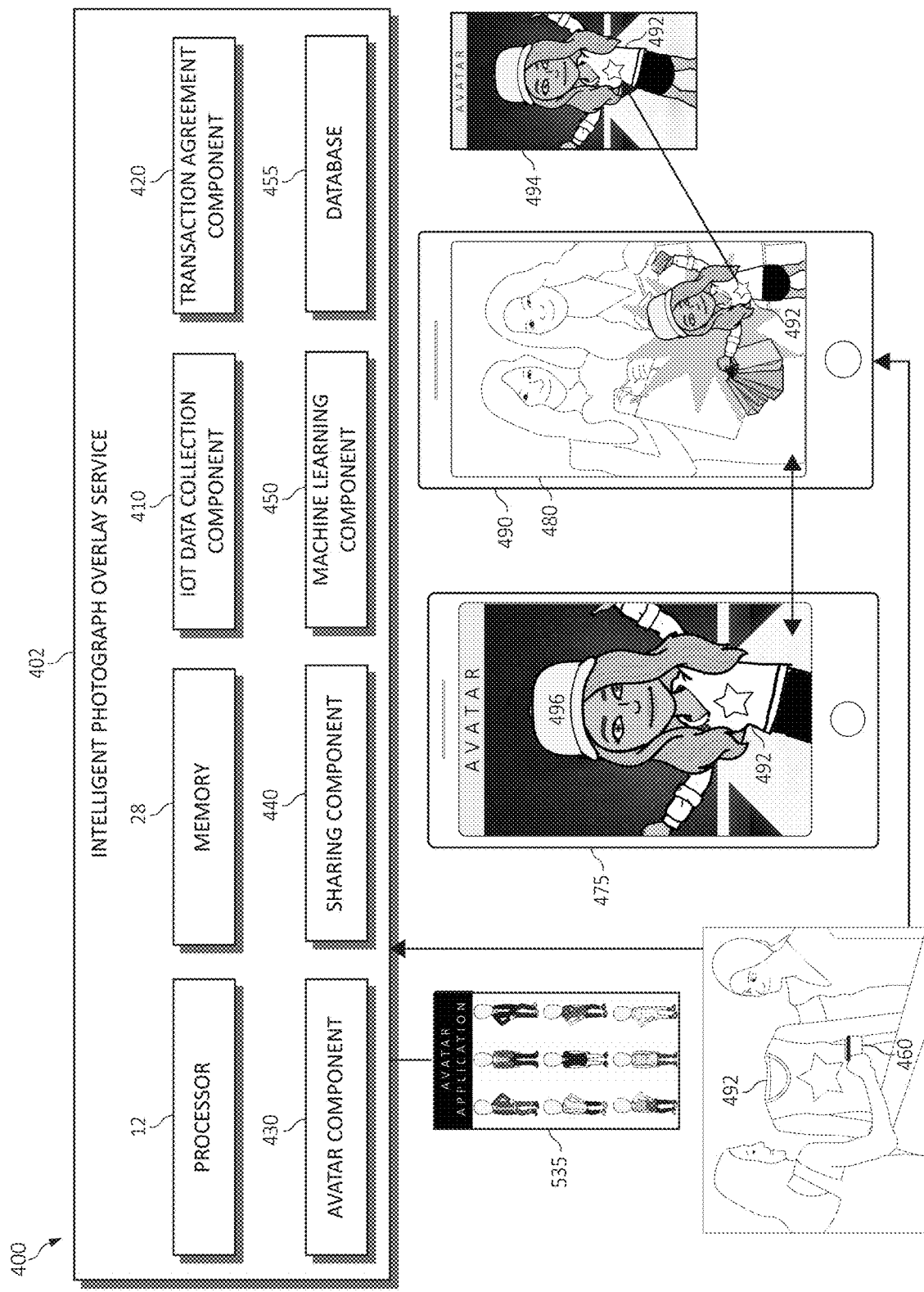
FIG. 4 is an additional block diagram depicting an exemplary functional relationship between various aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

The system 400 may include functional components such as an intelligent photograph overlay service 402, having an IoT data collection component 410, a transaction agreement component 420, an avatar component 430, a sharing component 440, a machine learning module 450, and a database 455, each of which may work in communication with each other.

The intelligent photograph overlay service 402 may be in communication with a financial transaction device 460 (or a user account associated with the financial transaction device 460). In one aspect, the financial transaction device 460 may be a credit card, a credit card processing machine associated with a business, an online shopping cart, or other type of application capable or enabled to perform a transaction agreement/monetary agreement between a user and a business offering goods or services.

The intelligent photograph overlay service 402 may be in communication with one or more computing devices/IoT devices such as, for example, IoT computing device 475 and/or 490. The IoT data collection component 410 may be used to harvest, collect, and store personal data in the database 455. That is, the IoT data collection component 410 may be used to monitor, collect, and or receive from IoT computing devices 475 and/or 490 a person's personal data such as, for example, one or more purchases and/or attempts for purchasing selected items available for purchase. The IoT data collection component 410 may also collect and receive data from the financial transaction device 460 relating to one or more transaction agreements (e.g., a monetary exchange) from one of the plurality of transaction agreement types from monetary exchange account. Additionally, a user may have a monetary exchange account that is associated with or used by the financial transaction device 460 (e.g., a credit card). Thus, the data from the monetary exchange account (e.g., a credit card account) may be communicated or sent to IoT data collection component 410. The transaction agreement (e.g., monetary exchange) may include, but not limited to, agreeing and/or exchanging various forms of value, including coins, currency, credit, debit, digital currency/cryptocurrency, and/or bank account funds, for prepaid cash cards, credit cards, phone cards, goods and services, and the like. Moreover, a monetary exchange may include a virtual currency transaction (e.g., digital currency transactions) such as, for example, Bitcoin transactions.

The IoT computing devices 475 and/or 490 may be devices used by cloud computers, such as, for example, the PDA or cellular telephone 54A, desktop computer 54B, laptop computer 54C, and/or automobile computer system 54N as described in FIG. 2. The IoT devices may also be sensor-based devices (e.g., body mounted/implanted sensors). Moreover, IoT computing devices 475 and/or 490 may be a smart phone and/or hand/held tablet and/or a wearable IoT device such as, for example, a smart watch.

The transaction agreement component 420 may detect and monitor one or more monetary exchanges for one or more users. Each monitored user may have a user account stored in database 455. The transaction agreement component 420 may also receive data relating to one or more transaction agreements and/or monetary agreements (e.g., purchases and/or attempted purchases associated) that may be associated a financial transaction device 460.

In one aspect, the monetary exchange account (e.g., credit card account) may be associated with the financial transaction device 460 (e.g., credit card). Additionally, the transaction agreement component 420 may also detect use of one or more commercial applications such as, for example, an online retail store provided by business that may include a shopping cart feature. In this way, the transaction agreement component 420 may identify and detect any activity relating to the shopping cart associated with the one or more commercial applications. The transaction agreement component 420 may also receive data from the one or more commercial applications indicting an attempt to purchase (e.g., abandoned online shopping cart) or one or more selected items (e.g., goods or services) offered for sale by the business. Alternatively, the transaction agreement component 420 may collect, harvest, and/or receive data from a monetary exchange account (e.g., a credit card account, bitcoin account, a user account associated with a third party capable of performing a financial transaction, a commercial application user account, or other type of application capable of performing a transaction agreement/monetary agreement).

The avatar component 430 may unlock one or more avatar features, filters, stickers such as, for example, those avatar features, filters, stickers associated from avatar application 435. Also, the avatar application 435 may also receive data related to the data collected from the IoT computing devices 475 and/or 490 and/or the transaction agreement component 420 for updating, adding, activating, and/or unlocking the transaction agreement component 420 the avatar features, filters, stickers associated with a selected item purchased or intended to be purchased.

The avatar component 430 may activate one or more avatar characteristic features, via database 455, associated with one or more selected items purchased and/or intended for purchase upon detecting a transaction agreement, via the transaction agreement component 420, from one of a plurality of transaction agreement types. The avatar component 430 may change (e.g., photo overlay) one or more avatar characteristic features on an avatar according to user preferences (which may be stored in a user profile of database 455), which may be collected data (e.g., collected personal data) from one or more computing devices such as, for example, IoT computing device 475 and/or 490.

That is, the avatar component 430 may define and/or identify the one or more avatar characteristic features such as, for example, the filters, stickers, semantic phrases, jewelry, articles of clothing, and/or purchased products from one or more third parties.

That is, the avatar component 430 may activate one or more avatar characteristic features associated with one or more selected items upon detecting a transaction agreement from one of a plurality of transaction agreement types. That is, the avatar component 430 may change one or more avatar characteristic features on an avatar according to a user preference and the purchased items (or intended to be purchased items in an online shopping cart). In an additional aspect, the avatar component 430 may select one or more avatar characteristic features relative to a location of the one or more selected items. The one or more avatar characteristic features may be selected for use with an application enabled to display the avatar.

The sharing component 440 may share the one or more avatar characteristic features with an alternative user. For example, a user making a purchase on a computing device such as, for example, IoT device 490 may purchase one or more items from a business. Immediately, the purchased items may be detected by the transaction agreement component 420 and the purchased items is now loaded into, activated from, and/or unlocked in the database 455 as an available avatar 494 (e.g., avatar, filter, sticker, etc.). The avatar component 430 may then systematically change the avatar 494 displayed on GUI 480 of the IoT device 490 showing the purchased item 492 on the avatar 494.

The avatar 494 (associated with a user/user account of IoT device 490) may be shared by the sharing component 440 with another user/user account (e.g., user B) that is associated with another computing device such as, for example, IoT device 475. The avatar component 430 may activate the shared avatar, filter, and/or sticker related to the purchased item 492. The avatar 496, associated with the alternative user that uses IoT device 475, may be displayed on the IoT device 475 with the shared avatar, filter, and/or sticker related to the purchased item 492.

A machine learning mechanism may be initialized to learn a type of data, the purchases, and the shared avatars, stickers, and filters of the user to be included in the user profile, a type of transaction agreements, one or more transaction agreement criteria, or a combination thereof. The machine learning module 450 may continuously and automatically receive from one or more IoT devices, such as IoT devices 404a-c, feedback according to intelligent photograph overlay service 402 applications for each user and shared user. That is, the machine learning component 418 may employ one or more cognitive applications (e.g., NPL, artificial intelligence (AI), machine learning, IBM® Watson® Alchemy Language (IBM Watson and Alchemy are trademarks of International Business Machines Corporation)) and one or more data resources.

In one aspect, the machine learning component 418 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

With the foregoing functional components 400 in view, consider the following example using various aspects of the illustrated embodiments. Assume user A and user B are associates (e.g., friends or family members) and shopping for various items on an online retail store via a commerce application of a selected business such as, for example, using a user equipment (UE) of user A. Assume user A completes a purchase (e.g., purchased item 492 that may be a shirt) via a shopping cart of the online retail store via a commerce application of the online retail store using a credit card. An avatar application associated with user A may identify the selected item 492 (e.g., the shirt) in the shopping cart and/or upon completion of the purchase transaction of the selected item 492. The avatar, filters, and/or stickers of the selected item 492 (e.g., the shirt) may be unlocked for access for use with the avatar of the avatar application associated with user A.

Assume now, user A opens another avatar application and/or one or more social media accounts and takes a photograph with user B. User A may now change, modify, update, and/or alter the avatar of the avatar application associated with user A. That is, the avatar characteristic feature (e.g., the selected item) may be systematically added to the avatar of user A. For example, the avatar of user A may now be dressed in an object/item that is similar and/or identical to the features the selected item 492 such as, for example, a shirt (e.g., the virtual, avatar shirt object mirrors the actual real life purchased shirt). Additionally, additional items associated with the selected item may also be available and unlocked for use with the avatar of user A. For example, the shopping bags 495 associated with the business that sold the shirt may also be displayed as on or with the avatar of user A (e.g., the avatar of user A may be holding shopping bags identical the those provided for purchases from the business that sold the shirt). The photograph taken of user A with user B is now shared with all of user A's social media or user account followers with user A's avatar on the photograph with the newly selected item (shirt) and shopping bags showing a discounted price on the avatar as well.

Moreover, user A may also share with one or more alternative users, associates, followers of the social media or avatar application account, or a combination thereof the avatar, filters, and/or stickers associated with the newly selected item (e.g., purchased item 492 that may be a shirt) and shopping bags for user by user B.

It should be note that in one embodiment, the avatars, filters, and stickers may be retrieved, extracted, and/or pulled from application purchases and may link to a credit card account so physical, in-store purchases can be identified as well. In an additional embodiment, the present invention may only allow certain colors, variances, accessories of products to be unlocked or enabled based on a user's purchase. For example, if a user (e.g., user A) purchases a pink shirt, the present invention may restrict and/or only allow user A- to use the pink shirt on user A's avatar or sticker rather than an alternative color option. Thus, the present invention may automatically populate the detailed elements for use with a user's avatars based on application purchases of goods and/or services.

Figure 5:
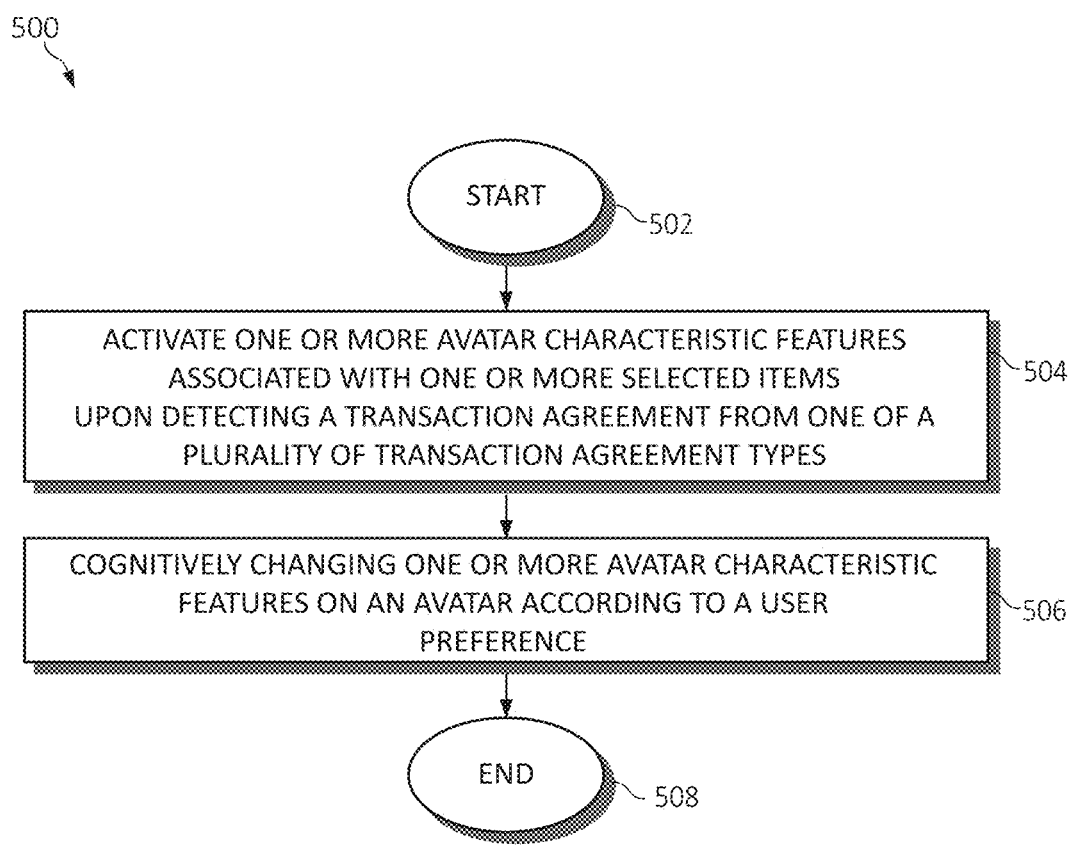
FIG. 5 is a flowchart diagram depicting an additional exemplary method for intelligent photograph overlay in a computing environment by a processor, again in which aspects of the present invention may be realized.

Turning now to FIG. 5, a method 500 intelligent photograph overlay in an Internet of Things (IoT) computing environment is depicted, in which various aspects of the illustrated embodiments may be implemented. The functionality 500 may be implemented as a method executed as instructions on a machine, where the instructions are included on at least one computer readable medium or on a non-transitory machine-readable storage medium. The functionality 500 may start in block 502.

One or more avatar characteristic features associated with one or more selected items may be activated upon detecting a transaction agreement from one of a plurality of transaction agreement types, as in block 504. The one or more avatar characteristic features may be changed on an avatar according to a user preference, as in block 506. The functionality 500 may end in block 508.

Figure 6:
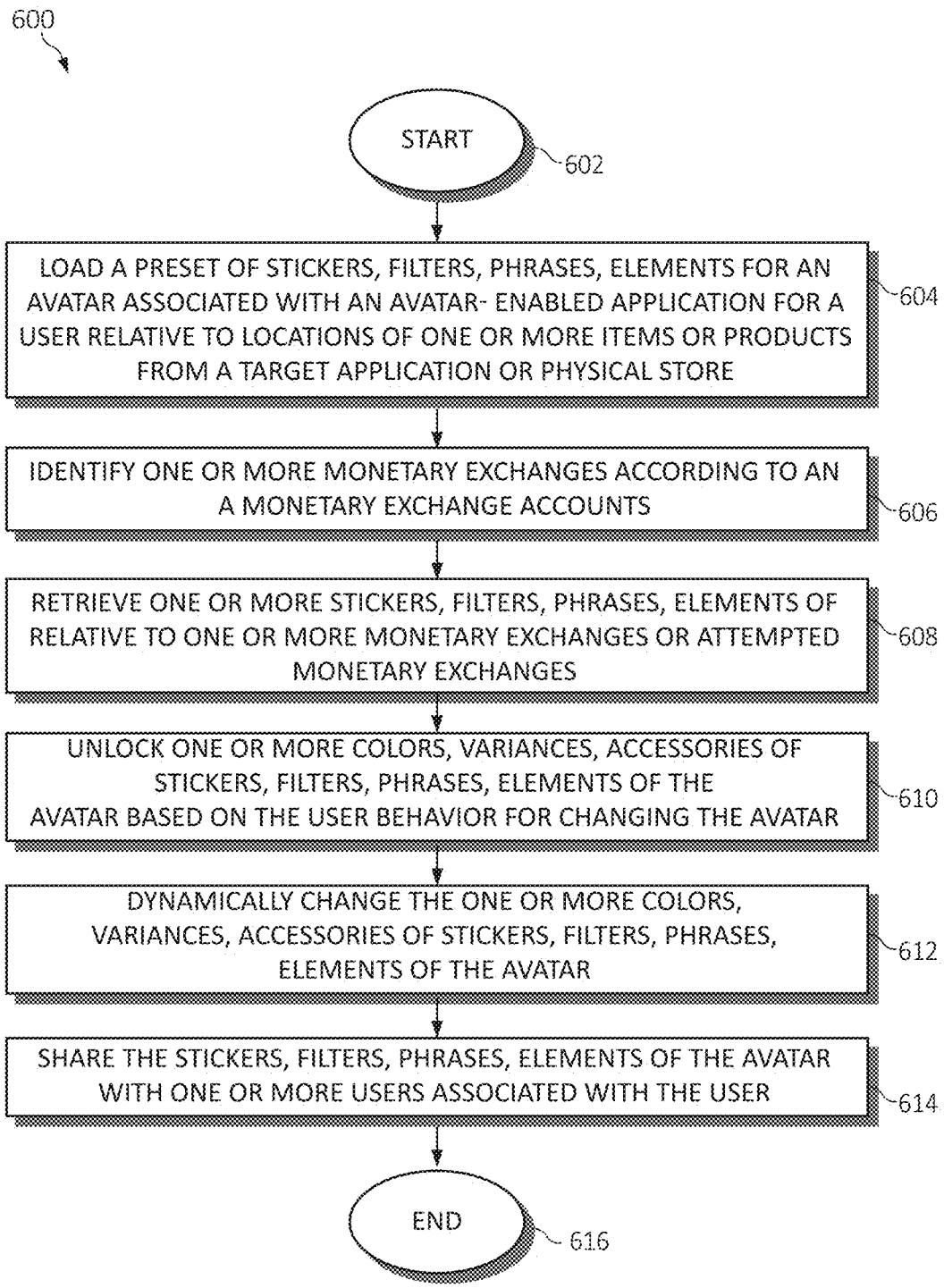
FIG. 6 is an additional flowchart diagram depicting an additional exemplary method for intelligent photograph overlay in an Internet of Things (IoT) computing environment by a processor, again in which aspects of the present invention may be realized.

Turning now to FIG. 6, a method 600 for intelligent photograph overlay in an Internet of Things (IoT) computing environment is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

A preset of stickers, filters, phrases, elements for an avatar associated with an avatar-enabled application for a user relative to locations of one or more s or products from a target application or physical store array be loaded (e.g., into the avatar-enabled application), as in block 604. One or more monetary exchanges may be identified according to a monetary exchange accounts, as in block 606. One or more stickers, filters, phrases, elements of the avatar relative to one or ore monetary exchanges or attempted monetary exchanges may be retrieved, as in block 608. One or more colors, variances; accessories of stickers, filters, phrases, elements of the avatar may be unlocked based on the user behavior for changing the avatar, as in block 610. The one or more colors, variances, accessories of stickers, filters, phrases, and/or elements of the avatar may be dynamically changed, as in block 612. The stickers, filters, phrases, and/or elements of the avatar may be shared with one or more users associated with the user, as in block 614. The functionality 600 may end in block 616.

In one aspect, in conjunction with and/or as part of at least one block of FIGS. 5-6, the operations of methods 500 and 600 may include each of the following. The operations of methods 500 and 600 may activate the one or more avatar characteristic features relative to a location of the one or more selected items. The one or more avatar characteristic features may be selected for use with an application enabled to display the avatar.

The operations of methods 500 and 600 may detect the transaction agreement for acquiring the selected items. The transaction agreement from one of the plurality of transaction agreement types from monetary exchange account may be identified. The operations of methods 500 and 600 may define the one or more avatar characteristic features as filters, stickers, semantic phrases, jewelry, articles of clothing, and purchased products from one or more third parties. The one or more avatar characteristic features may be shared with an alternative user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent photograph overlay in an Internet of Things (IoT) computing environment, comprising:
   detecting a transaction agreement from one of a plurality of transaction agreement types is initiated by a user according to one or more selected items being placed in a shopping cart of an online commerce application;
   detecting that the user has abandoned the shopping cart having the one or more selected items contained therein;
   responsive to detecting that the user has abandoned the shopping cart, activating one or more avatar characteristic features associated with the one or more selected items;
   wherein the one or more avatar characteristic features are contextually identified as being related to the one or more selected items of the transaction agreement for presentation to the user notwithstanding whether the user explicitly selects the one or more avatar characteristic features associated with the one or more items for activation; and
   changing one or more avatar characteristic features on an avatar according to a user preference.

2. The method of claim 1, further including activating the one or more avatar characteristic features relative to a location of the one or more selected items.

3. The method of claim 1, further including selecting the one or more avatar characteristic features for use with an application enabled to display the avatar.

4. The method of claim 1, further including detecting the transaction agreement for acquiring the selected items.

5. The method of claim 1, further including identifying the transaction agreement from one of the plurality of transaction agreement types from monetary exchange account.

6. The method of claim 1, further including defining the one or more avatar characteristic features as filters, stickers, semantic phrases, jewelry, articles of clothing, and purchased products from one or more third parties.

7. The method of claim 1, further including sharing the one or more avatar characteristic features with an alternative user.

8. A system for intelligent photograph overlay in an Internet of Things (IoT) computing environment, comprising:
one or more computers with executable instructions that when executed cause the system to:
detect a transaction agreement from one of a plurality of transaction agreement types is initiated by a user according to one or more selected items being placed in a shopping cart of an online commerce application;
detect that the user has abandoned the shopping cart having the one or more selected items contained therein;
responsive to detecting that the user has abandoned the shopping cart, activate one or more avatar characteristic features associated with the one or more selected items;
wherein the one or more avatar characteristic features are contextually identified as being related to the one or more selected items of the transaction agreement for presentation to the user notwithstanding whether the user explicitly selects the one or more avatar characteristic features associated with the one or more items for activation; and
change one or more avatar characteristic features on an avatar according to a user preference.

9. The system of claim 8, wherein the executable instructions further activate the one or more avatar characteristic features relative to a location of the one or more selected items.

10. The system of claim 8, wherein the executable instructions further select the one or more avatar characteristic features for use with an application enabled to display the avatar.

11. The system of claim 8, wherein the executable instructions further detect the transaction agreement for acquiring the selected items.

12. The system of claim 8, wherein the executable instructions further identify the transaction agreement from one of the plurality of transaction agreement types from monetary exchange account.

13. The system of claim 8, wherein the executable instructions further define the one or more avatar characteristic features as filters, stickers, semantic phrases, jewelry, articles of clothing, and purchased products from one or more third parties.

14. The system of claim 8, wherein the executable instructions further share the one or more avatar characteristic features with an alternative user.

15. A computer program product for intelligent photograph overlay by a processor, the computer program product comprising a non-transitory computer-readable storage medium having computer-readable program code portions stored therein, the computer-readable program code portions comprising:
an executable portion that detects a transaction agreement from one of a plurality of transaction agreement types is initiated by a user according to one or more selected items being placed in a shopping cart of an online commerce application;
an executable portion that detects that the user has abandoned the shopping cart having the one or more selected items contained therein;
an executable portion that, responsive to detecting the user has abandoned the shopping cart, activates one or more avatar characteristic features associated with the one or more selected items; wherein the one or more avatar characteristic features are contextually identified as being related to the one or more selected items of the transaction agreement for presentation to the user notwithstanding whether the user explicitly selects the one or more avatar characteristic features associated with the one or more items for activation; and
an executable portion that changes one or more avatar characteristic features on an avatar according to a user preference.

16. The computer program product of claim 15, further including an executable portion that activates the one or more avatar characteristic features relative to a location of the one or more selected items.

17. The computer program product of claim 15, further including an executable portion that selects the one or more avatar characteristic features for use with an application enabled to display the avatar.

18. The computer program product of claim 15, further including an executable portion that:
detects the transaction agreement for acquiring the selected items; or
identifies the transaction agreement from one of the plurality of transaction agreement types from monetary exchange account.

19. The computer program product of claim 15, further including an executable portion that defines the one or more avatar characteristic features as filters, stickers, semantic phrases, jewelry, articles of clothing, and purchased products from one or more third parties.

20. The computer program product of claim 15, further including an executable portion that shares the one or more avatar characteristic features with an alternative user.

* * * * *